(12) United States Patent
Eisaman et al.

(10) Patent No.: US 9,586,181 B2
(45) Date of Patent: Mar. 7, 2017

(54) ELECTRODIALYTIC SEPARATION OF $CO_2$ GAS FROM SEAWATER

(75) Inventors: Matthew D. Eisaman, Newark, CA (US); Karl Littau, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1204 days.

(21) Appl. No.: 13/177,421

(22) Filed: Jul. 6, 2011

(65) Prior Publication Data

US 2013/0008792 A1  Jan. 10, 2013

(51) Int. Cl.
  *B01D 61/44* (2006.01)
  *C02F 1/469* (2006.01)
  *C02F 103/08* (2006.01)

(52) U.S. Cl.
  CPC .......... *B01D 61/445* (2013.01); *C02F 1/4693* (2013.01); *B01D 2311/18* (2013.01); *B01D 2311/2626* (2013.01); *B01D 2311/2653* (2013.01); *C02F 2103/08* (2013.01); *C02F 2201/4618* (2013.01); *Y02C 10/04* (2013.01); *Y02C 10/06* (2013.01)

(58) Field of Classification Search
  USPC ................................. 204/529, 531, 534, 537
  See application file for complete search history.

(56) References Cited

U.S. PATENT DOCUMENTS

| | | | |
|---|---|---|---|
| 3,878,086 A | 4/1975 | Haswell et al. | |
| 3,933,617 A | 1/1976 | Yamamoto et al. | |
| 4,219,396 A | * 8/1980 | Gancy et al. | 204/517 |
| 4,238,305 A | * 12/1980 | Gancy et al. | 204/538 |
| 4,584,077 A | 4/1986 | Chlanda et al. | |
| 4,592,817 A | 6/1986 | Chlanda et al. | |

(Continued)

OTHER PUBLICATIONS

M.D. Eisaman, D.E. Schwartz, S. Amic, D. Lamer, J. Zesch, F. Torres and K. Littau, Energy-efficient electrochemical CO2 capture from the atmosphere, Technical Proceedings of the 2009 Clean Technology Conference and Trade Show, 2009, pp. 175-178.

(Continued)

*Primary Examiner* — Arun S Phasge
(74) *Attorney, Agent, or Firm* — Marger Johnson

(57) ABSTRACT

A method comprises flowing process solution and electrode solution into a BPMED apparatus, applying a voltage such that the process solution is acidified and basified and dissolved $CO_2$ is generated, flowing the process solution out of the apparatus, and desorbing $CO_2$ out of the process solution. A method for desorbing $CO_2$ from an ocean comprises flowing seawater and electrode solution into a BPMED apparatus, applying a voltage such that dissolved $CO_2$ is generated, flowing the seawater out of the apparatus, and desorbing $CO_2$ out of the seawater. A method for producing a desalted solution and $CO_2$ gas comprises flowing process solution and electrode solution into a BPMED apparatus that includes one or more three-compartment cells, applying a voltage such that the process solution is acidified, basified, and desalted, flowing the process solution out of the apparatus, and desorbing $CO_2$ out of the process solution.

14 Claims, 9 Drawing Sheets

(56) References Cited

U.S. PATENT DOCUMENTS

| | | | |
|---|---|---|---|
| 4,636,289 A | 1/1987 | Mani et al. | |
| 2004/0060823 A1 | 4/2004 | Carson et al. | |
| 2006/0051274 A1 | 3/2006 | Wright et al. | |
| 2007/0169625 A1 | 7/2007 | Aines et al. | |
| 2007/0187247 A1 | 8/2007 | Lackner et al. | |
| 2008/0031801 A1 | 2/2008 | Lackner et al. | |
| 2008/0087165 A1 | 4/2008 | Wright et al. | |
| 2009/0159456 A1 | 6/2009 | Littau | |
| 2009/0233155 A1 | 9/2009 | Littau | |
| 2009/0288957 A1* | 11/2009 | Detournay et al. | 205/482 |
| 2009/0294366 A1 | 12/2009 | Wright et al. | |
| 2009/0301297 A1 | 12/2009 | Littau | |
| 2010/0005959 A1 | 1/2010 | Littau et al. | |
| 2010/0059377 A1 | 3/2010 | Littau et al. | |
| 2012/0152744 A1 | 6/2012 | Eisaman | |
| 2012/0152747 A1 | 6/2012 | Eisaman | |

OTHER PUBLICATIONS

R.J. Pearson, J.W.G. Turner, M.D. Eisaman, and K.A. Littau, Sustainable Organic Fuels for Transport (SOFT)—A Concept for Compatible Affordable Mobility Using Carbon-Neutral Liquid Fuels, Proceedings of SIA (Société des Ingénieurs de l'Automobile) 2009, 11 pages, Strasbourg, France, Dec. 2-3, 2009.
R.J. Pearson, J.W.G. Turner, M.D. Eisaman, and K.A. Littau, Extending the Supply of Alcohol Fuels for Energy Security and Carbon Reduction, Proceedings of SAE 2009 Powertrains Fuels and Lubricants Meeting, Nov. 2009, 28 pages, San Antonio, TX, paper No. 2009-1-2764.
Matthew D. Eisaman, Luis Alvarado, Bhaskar Garg, Dan Larner, and Karl A. Littau, CO2 concentration using bipolar membrane electrodialysis, poster presented at Gordon Research Conference on Electrochemistry, Ventura, CA, Jan. 10-15, 2010.
H. Nagasawa, A. Yamasaki, A. Iizuka, K. Kumagai and Y. Yanagisawa, A New Recovery Process of Carbon Dioxide from Alkaline Carbonate Solution via Electrodialysis, Dec. 2009, pp. 3286-3293, AIChE Journal, vol. 55, Issue 12.
H. Nagasawa, A. Yamasaki, and Y. Yanagisawa, Carbon Dioxide Recovery from Carbonate Solutions by an Electrodialysis Method, 6th Annual Conference on Carbon Capture & Sequestration, May 7-10, 2007, 7 pages.
Moon-Sung Kang, Seung-Hyeon Moon, You-In Park, and Kew-Ho Lee, Development of Carbon Dioxide Separation Process Using Continuous Hollow-Fiber Membrane Contactor and Water-Splitting Electrodialysis, Separation Science and Technology, 2002, pp. 178-1806, vol. 37, Issue 8.
X. Zhang, W. Lu, H. Ren, W. Cong, Sulfuric Acid and Ammonia Generation by Bipolar Membrane Electrodialysis: Transport Rate Model for Ion and Water Through Anion Exchange Membrane, Chemical and Biochemical Engineering Quarterly, 2008, pp. 1-8, vol. 22, Issue 1.
IPCC, Climate Change 2007: Synthesis Report. Contribution of Working Groups I, II and III to the Fourth Assessment Report of the Intergovernmental Panel on Climate Change, 2007, 104 pages, Geneva, Switzerland.
F.S. Zeman, D.W. Keith, Carbon Neutral Hydrocarbons, Philosophical Transactions of the Royal Society, 2008, pp. 3901-3918, vol. 366, Issue 1882.
M. Eisaman, D. Schwartz, S. Amic, R. Stumpp, D. Larner, J. Zesch, and K. Littau, Carbon-Neutral Liquid Fuel from Sunlight, Air, and Water, poster presented at Gordon Research Conference on Renewable Energy: Solar Fuels, Ventura, CA, Feb. 1-6, 2009.
M. D. Eisaman, L. L Alvarado, D. Larner, P. Wang, B. Garg, and K. A. Littau, CO2 separation using bipolar membrane electrodialysis, Energy and Environmental Science, Oct. 29, 2010, 10 pages, Royal Society of Chemistry, UK.
V. I. Zabolotskii, et al., Regeneration of Monoethanolamine-Based Sorbents of Carbon Dioxide by Electrodialysis with Bipolar Membranes, J. Appl. Chem., 1985, pp. 2222-2225, vol. 58.

International Conference and Exhibition, The Spark Ignition Engine of the Future: Facing the CO2 and Electrification Challenges, Dec. 2 & 3, 2009.
Ameridia, "Bipolar Membrane Electrodialysis," http://www.ameridia.com/html/eb.html (Accessed Mar. 1, 2011).
Dr. Pieter Tans, "Trends in Atmospheric Carbon Dioxide", NOAA/ESRL, www.esrl.noaa.gov/gmd/ccgg/trends, (Accessed Mar. 1, 2011).
Calera, Green Cement for a Blue Planet, http://www.calera.com/index.php/technology/technology_vision/ (Accessed Mar. 1, 2011).
Parc, Renewable Liquid Fuels, http://www.parc.com/work/focus-area/adaptive-energy/ (Accessed Mar. 1, 2011).
G.A. Olah, A. Goeppert, and G.K. Surya Prakash, Beyond Oil and Gas: The Methanol Economy, 2006, pp. 239-247, Wiley-VCH, Germany.
A. Bandi, M. Specht, T. Weimer and K. Schaber, CO2 Recycling for Hydrogen Storage and Transportation—Electrochemical CO1 Removal and Fixation, Energy Conversion and Management, vol. 36, No. 6-9, pp. 899-902, 1995.
R. Bishnoi, Renewable Energy Systems Wanted in Iraq, InsideDefense.com, Aug. 11, 2006, 3 Pages.
R. Bryce, Gas Pains, The Atlantic, May 2005, 3 Pages.
S. Buchanan, Energy and Force Transformation, Joint Force Quarterly, Issue 42, 3rd Quarter 2006, National Defense University Press, 5 Pages.
James N. Butler, Carbon Dioxide Equilibria and Their Applications, 1982, pp. 118-123, Addison-Wesley Publishing Company, Inc.
Mark Clayton, In the Iraqi War Zone, US Army Calls for 'Green' Power, Christian Science Monitor, Sep. 7, 2006, 3 Pages.
T. A. Davis, Zero Discharge Seawater Desalination: Integrating the Production of Freshwater, Salt, Magnesium and Bromine, Reclamation Managing Water in the West, May 2006, U.S. Department of the Interior Bureau of Reclamation, 38 Pages.
R. W. Dorner, H. D. Willauer, D. R. Hardy, F. W. Williams, Effects of Loading and Doping on Iron-based CO2 Hydrogenation Catalysts, Aug. 24, 2009, Naval Research Laboratory, 19 Pages.
K. W. Harrison, B. Kramer, B. Kroposki, T. Ramsden, J. Levene, C. Pink, Renewable Electrolysis Integrated System Development and Testing, Department of Energy Hydrogen Program, FY 2007 Annual Progress Report, 4 Pages.
P. Dimotakis, et al., Reducing DoD Fossil-Fuel Dependence, JASON, The MITRE Corporation, Sep. 2006, 105 Pages.
E. P. Koszenski, D. B. Heppner, C. T. Bunnell, Electrochemical Carbon Dioxide Concentrator Subsystem Development, NASA, Mar. 1986, 92 Pages.
Report of the Subcommittee on U.S. Antarctic Program Resupply, National Science Foundation Office of Polar Programs Advisory Committee, Aug. 2005, 85 Pages.
K. Schultz, et al., Hydrogen and Synthetic Hydrocarbon Fuels—A Natural Synergy, Proceedings of the National Hydrogen Association Meeting, Long Beach, CA, Mar. 13-16, 2006, 10 Pages.
Stolaroff, Joshuah K., Capturing CO2 from Ambient Air: A Feasibility Assessment, Carnegie Mellon Engineering, 2006, 95 Pages.
J. K. Stolaroff, D. W. Keith, G. V. Lowry, Carbon Dioxide Capture from Atmospheric Air Using Sodium Hydroxide Spray, Environmental Science and Technology, 2008, vol. 42, No. 8, pp. 2728-2735.
J. K. Stolaroff, D. W. Keith, G. V. Lowry, Carbon Dioxide Capture from Atmospheric Air Using Sodium Hydroxide Spray: Supporting Information, Feb. 2008, 12 Pages.
R. E. Uhrig, K. R. Schultz, S. L. Bogart, Implementing the "Hydrogen Economy" with Synfuels, The Bent of Tau Beta Pi, Summer 2007, 6 Pages.
C. R. Visser, Electrodialytic Recovery of Acids and Bases, University of Groningen, Feb. 2001, 158 Pages.
F. G. Wilhelm, Bipolar Membrane Electrodialysis, University of Twente, 2001, 242 Pages.
Frank Zeman, Energy and Material Balance of CO2 Capture from Ambient Air, Environmental Science and Technology, vol. 41, No. 21, 2007, pp. 7558-7563.
DiMascio, F., et al, Extraction of Carbon Dioxide from Seawater by an Electrochemical Acidification Cell Part I—Initial Feasibility

(56) References Cited

OTHER PUBLICATIONS

Studies, pp. 1-20, NRL/MR/6180-10-9274, published Jul. 23, 2010 by the Naval Research Laboratory.†
Willauer, H.D., et al, "Extraction of Carbon Dioxide from Seawater by an Electrochemical Acidification Cell Part II—Laboratory Scaling Studies", pp. 1-15, NRL/MR/6180-11-9329, published Apr. 11, 2011 by the Naval Research Laboratory.†
H. Strathmann, G.H. Koops, "Process economics of the electrodialytic water dissociation for the production of acid and base", Chapter 7 of A.J.B. Kemperman (Ed.), "Handbook on Bipolar Membrane Technology", Twente University Press, Enschede, 2000.†

\* cited by examiner
† cited by third party

ELECTRODIALYTIC SEPARATION OF $CO_2$ GAS FROM SEAWATER

STATEMENT REGARDING FEDERALLY SPONSORED RESEARCH AND DEVELOPMENT

This invention was made with Government support under contract HR0011-10-C-0147 awarded by DARPA, an agency of the United States Department of Defense. The Government has certain rights in this invention.

BACKGROUND

The concentration of atmospheric carbon dioxide ($CO_2$) continues to rise, as shown by, for example, IPCC, *Climate Change 2007: Synthesis Report. Contribution of Working Groups I, II and III to the Fourth Assessment Report of the Intergovernmental Panel on Climate Change*, 2007 [Core Writing Team, Pachauri, R. K and Reisinger, A. (eds.)], IPCC, Geneva, Switzerland, 104 pp. The concentration of atmospheric $CO_2$ is rising at the rate of approximately 2 parts per million per year (ppm/yr). The concentration of $CO_2$ in the atmosphere is approximately 385 ppm.

The world's oceans have been absorbing and releasing atmospheric $CO_2$ for eons. Atmospheric $CO_2$ dissolves in the oceans' water, reacting with the seawater to form carbonic acid. Carbonic acid in turn releases hydrogen ions ($H^+$), forming bicarbonate ($HCO_3^-$) and carbonate ($CO_3^{-2}$) ions. The pH of seawater, which determines the relative fractions of dissolved $CO_2$, $HCO_3^-$ and $CO_3^{-2}$, is typically around 8.3, meaning that most of the dissolved total carbon in seawater is in the form of $HCO_3^-$, as discussed in, for example, James N. Butler, *Carbon Dioxide Equilibria and Their Applications*, Addison-Wesley Publishing Company, Menlo Park, Calif., 1982. As the atmospheric concentration of $CO_2$ increases, so too does the oceanic concentration of dissolved $CO_2$ increase. See, e.g., Holli Riebeek, *The Ocean's Carbon Balance*, NASA Earth Observatory Feature Article, http://earthobservatory.nasa.gov/Features/Ocean-Carbon/printall.php (last visited Jun. 20, 2011). The volumetric concentration of $CO_2$ in seawater is comparatively much higher than that in the atmosphere, with approximately 100 times as much $CO_2$ in one liter of seawater as there is in one liter of air.

Techniques for separating $CO_2$ from streams of mixed gases, such as separating $CO_2$ from the atmosphere, typically involve a two-step process of capture and desorption/regeneration. First, the gas is contacted with an aqueous "pre-capture solution" that reacts with the $CO_2$ gas in the mixed-gas stream, "capturing" the $CO_2$ into what is then referred to as a "post-capture solution." A stream of pure $CO_2$ gas can then be desorbed from the $CO_2$-rich aqueous post-capture solution, while at the same time regenerating the post-capture into a pre-capture solution that can be reused for additional capture cycles.

The pre-capture solution is contained in a "contactor," a structure that contacts the mixed-gas stream from which the $CO_2$ is to be separated with the pre-capture solution. Various pre-capture solutions exist, including aqueous hydroxide pre-capture solutions such as potassium hydroxide (KOH) or sodium hydroxide (NaOH); aqueous carbonate pre-capture solutions such as potassium carbonate ($K_2CO_3$) or sodium carbonate ($Na_2CO_3$); and aqueous bicarbonate pre-capture solutions such as potassium bicarbonate ($KHCO_3$) or sodium bicarbonate ($NaHCO_3$). Other pre-capture solutions are known, for example, monoethanolamine (MEA), which is used in gas-stream scrubbing applications to remove, for example, $CO_2$ from flue gas. The capture of $CO_2$ gas into hydroxide/carbonate/bicarbonate pre-capture solutions converts the original pre-capture solution into a more acidic post-capture solution consisting of a mixture of hydroxide (KOH or NaOH), carbonate ($K_2CO_3$ or $Na_2CO_3$), and/or potassium bicarbonate ($KHCO_3$) or sodium bicarbonate ($NaHCO_3$) post-capture solutions, as examples.

After $CO_2$ capture and desorption/regeneration, the post-separation $CO_2$ can be, for example, geologically sequestered, or incorporated into useful products such as concrete, as shown by Calera, Green Cement for a Blue Planet, http://dev.calera.com/index.ppp/technology/technology_vision/index.html (last visited Jun. 20, 2011); plastics, as shown by G. A. Olah et al., *Beyond Oil and Gas: The Methanol Economy*, Wiley-VCH (2006); or liquid hydrocarbon fuels, as shown by F. S. Zeman & D. W. Keith, Carbon Neutral Hydrocarbons, *Phil. Trans. R. Soc. A*, 366, 3901-3918 (2008), and PARC, Energy Efficiency, http://www.parc.com/work/focus-area/adaptive-energy/ (last visited Jun. 20, 2011).

Generation of liquid hydrocarbon fuel, such as gasoline, diesel, or JP-8, from $CO_2$ separated from mixed-gas streams may be of particular importance in remote field operations, such as those engaged in by the U.S. military (see, for example, JASON, "Reducing DOD Fossil-Fuel Dependence," JSR-06-135, 2006, p. 30) or the U.S. NSF Antarctic Program (see, for example, J. Swift, et. al., "Report of the Subcommittee on US Antarctic Program Resupply," NSF Office of Polar Programs Advisory Committee, Arlington, Va., 2005). However, due to the large size of contactors needed for traditional $CO_2$ separation, the remote, on-site generation of liquid hydrocarbon fuel has so far not been realized.

Bipolar membrane electrodialysis (BPMED) can be used to convert aqueous salt solution into acids and bases without the addition of other chemicals. BPMED devices use ion exchange membranes to separate ionic species in solution when a voltage is applied across a stack of membranes. BPMED of aqueous carbonate solutions at pressures above ambient pressure has been shown to efficiently desorb $CO_2$ gas from post-capture solutions. See U.S. patent application Ser. No. 12/969,465; U.S. patent application Ser. No. 12/269,485. Because of the very low (385 ppm) concentration of $CO_2$ in the atmosphere, large volumes of air must be processed to capture $CO_2$ from the atmosphere into aqueous carbonate solution systems. This results in a system that may not be as compact as required for certain applications, such as deployment in remote locations. Because the surface of the ocean essentially serves as a contactor, $CO_2$ desorption directly from seawater eliminates the need for contactors, resulting in a more compact system for $CO_2$ separation.

Example embodiments address these and other disadvantages.

DETAILED DESCRIPTION

Figure 1:
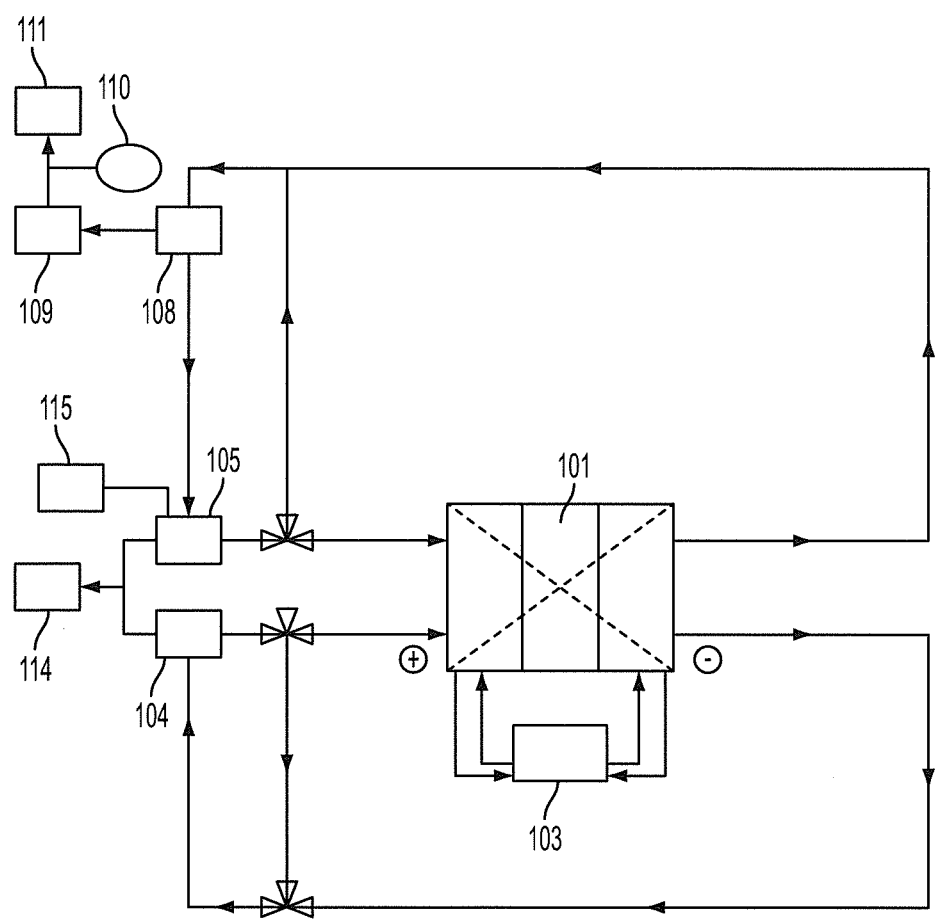
FIG. 1 is a schematic of a BPMED system, operated in "batch" mode, that is used to extract $CO_2$ from a process solution according to embodiment processes.

As discussed above, there is a need to develop remote, on-site generation of liquid hydrocarbon fuels. Efforts have been made to capture and regenerate $CO_2$ from the atmosphere, which can then be incorporated into a variety of useful products, include liquid hydrocarbon fuels. However, to capture and regenerate $CO_2$ from the atmosphere, inherently large volumes of air must be processed using large "contactors," resulting in a system that may not be as compact as required for some applications.

These disadvantages can be overcome by example embodiments, which obtain $CO_2$ directly from a process solution using bipolar membrane electrodialysis (BPMED). The process solution can be a seawater solution, either "idealized" (without divalent cations), or non-idealized (with divalent cations, as found in the ocean); a reverse osmosis (RO) brine solution; or any other solution containing dissolved $CO_2$ gas or $HCO_3^-$ or $CO_3^{2-}$ ions. Non-idealized seawater solution can be either made from a solution containing divalent cations, such as Instant Ocean® Sea Salt, or can be real seawater taken from an ocean. In the case of a process solution that is a seawater solution, not only is the amount of $CO_2$ in one liter of seawater—predominately in the form of bicarbonate ions—about 100 times the amount in one liter of air, but extracting $CO_2$ directly from seawater eliminates the need for a contactor that is inherent when capturing $CO_2$ from the air because in a seawater system, the surface of the ocean effectively acts as one large contactor. This greatly reduces the volumetric footprint of a $CO_2$-from-seawater system compared to a $CO_2$-from-air system. Further, for the $CO_2$-from-seawater system, no external chemicals other than electrode rinse solutions are needed. Seawater and electrical power are the only inputs into the system.

To understand how example embodiments work, it is first necessary to understand BPMED. BPMED converts aqueous salt solutions into acids and bases. Currently available BPMED apparatuses include an electrodialysis membrane stack made up of at least one electrodialysis cell. The electrodialysis cell includes at least one bipolar membrane (BPM) such that, when an electrical potential is applied across the cell, the dissociation of water into hydrogen ions ($H^+$) and hydroxide ions ($OH^-$) occurs.

A BPM is formed from a cation-exchange layer laminated together with an anion-exchange layer, as well as a junction layer between the cation and anion layers. Water diffuses into the junction layer, reaching the usual equilibrium with $H^+$ and $OH^-$ ions according to its dissociation constant. Typically, a BPM is oriented such that the anion-exchange layer faces the anode (positive electrode) end of the BPMED apparatus and the cation-exchange layer faces the cathode (negative electrode) end of the apparatus. This orientation allows the $OH^-$ ions to be transported across the anion-exchange layer and the $H^+$ anions to be transported across the cation-exchange layer when an electrical potential is applied across the membrane stack. Simultaneously, the constituent cations and anions of an input salt solution are separated under the applied electrical potential via ion exchange membranes—either anion exchange membranes (AEMs), cation exchange membranes (CEMs), or some combination of the two. The $OH^-$ ($H^+$) ions "produced" by the BPM then combine with the cations (anions) separated from the input salt solution to produce basic (acidic) output solutions containing the parent acid and base of the input salt. Depending on the membrane configuration—for example, in a membrane stack composed of one or more "three-compartment" cells—a diluted salt solution may also be produced as output in addition to the acid and base output solutions.

A BPMED membrane stack can have either a two-compartment or a three-compartment configuration. In a two-compartment configuration, adjacent membranes may alternate between BPM and AEM to form a membrane stack of the form BPM, AEM, BPM, AEM, etc.; or adjacent membranes may alternate between BPM and CEM to form a membrane stack of the form BPM, CEM, BPM, CEM, etc. In a three-compartment cell, adjacent membranes may cycle from BPM to AEM to CEM, forming a membrane stack of the form BPM, AEM, CEM, BPM, AEM, CEM, etc. Electrodialysis without bipolar membranes is also possible, and consists of a two-compartment configuration formed by an alternating series of AEM and CEM to form a membrane stack of the form AEM, CEM, AEM, CEM, AEM, etc. For any of these configurations, each of the end membranes at the two ends of the membrane stack may be an AEM, CEM, or BPM, depending on the configuration and process conditions.

Figure 2:
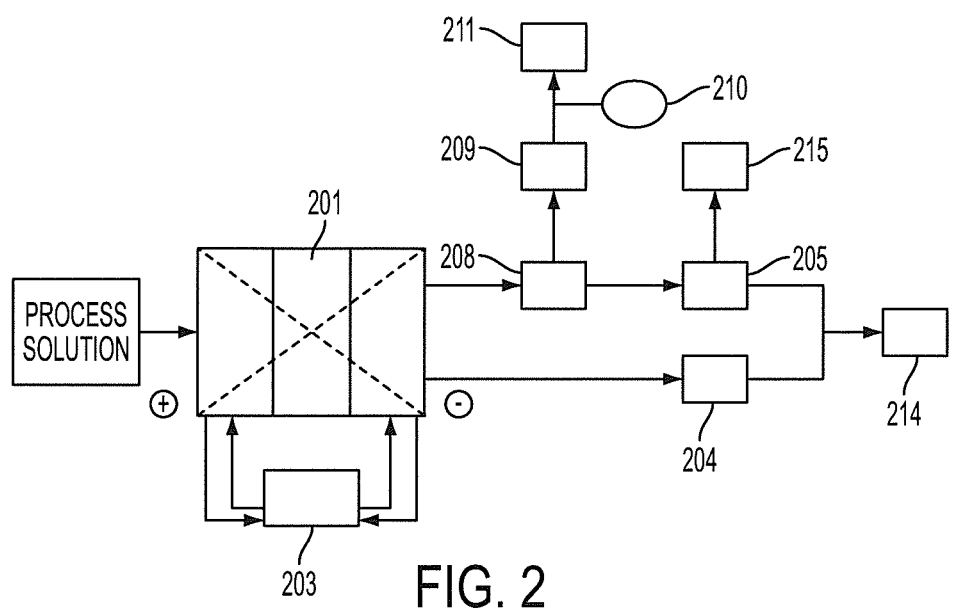
FIG. 2 is a schematic of a BPMED system, operated in "once-through" mode, that is used to extract $CO_2$ from a process solution according to embodiment processes.

FIGS. 1 and 2 show schematics of a BPMED system used to extract $CO_2$ from a process solution such as, for example, a seawater solution or RO brine. The system includes a BPMED apparatus 101/201, which includes a BPMED membrane stack. The membrane stack can consist of either one or more two-compartment cells (for example, FIG. 3), or one or more three-compartment cells (for example, FIG. 4).

FIG. 1 depicts a BPMED system operated in "batch mode." FIG. 2 depicts a BPMED system operated in "once-through" mode. The differences between a BPMED system operated in "batch mode" and a BPMED system operated in "once-through" mode will be described below with respect to these figures.

"Batch" Mode

FIG. 1 is a schematic of a BPMED system, operated in "batch" mode, that is used to extract $CO_2$ from a process solution according to embodiment processes. In batch mode, a process solution is flowed through the apparatus more than one time. In the case of seawater, the seawater may be pumped directly from the ocean into the apparatus, pumped through the apparatus 101 multiple times to undergo one of the described processes, and then be returned directly to the sea.

Figure 3:
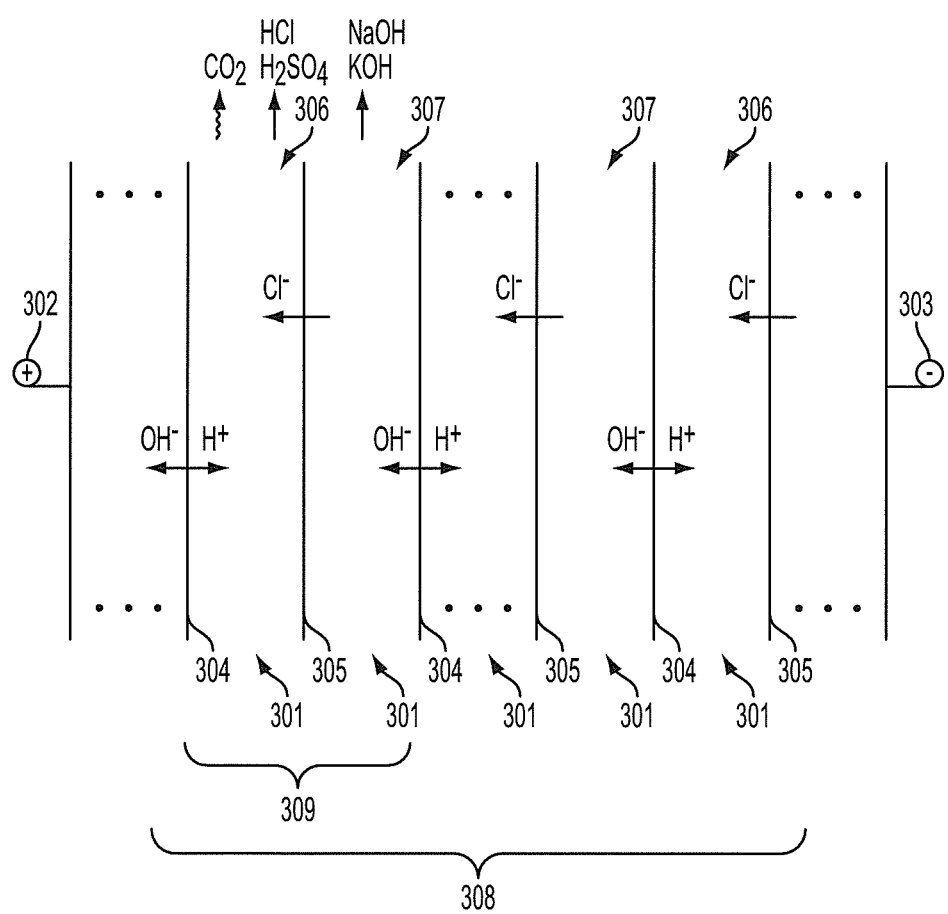
FIG. 3 is a schematic of a BPMED membrane stack operation used to generate $CO_2$ gas from a process solution using a "two-compartment" BPMED stack.
Figure 4:
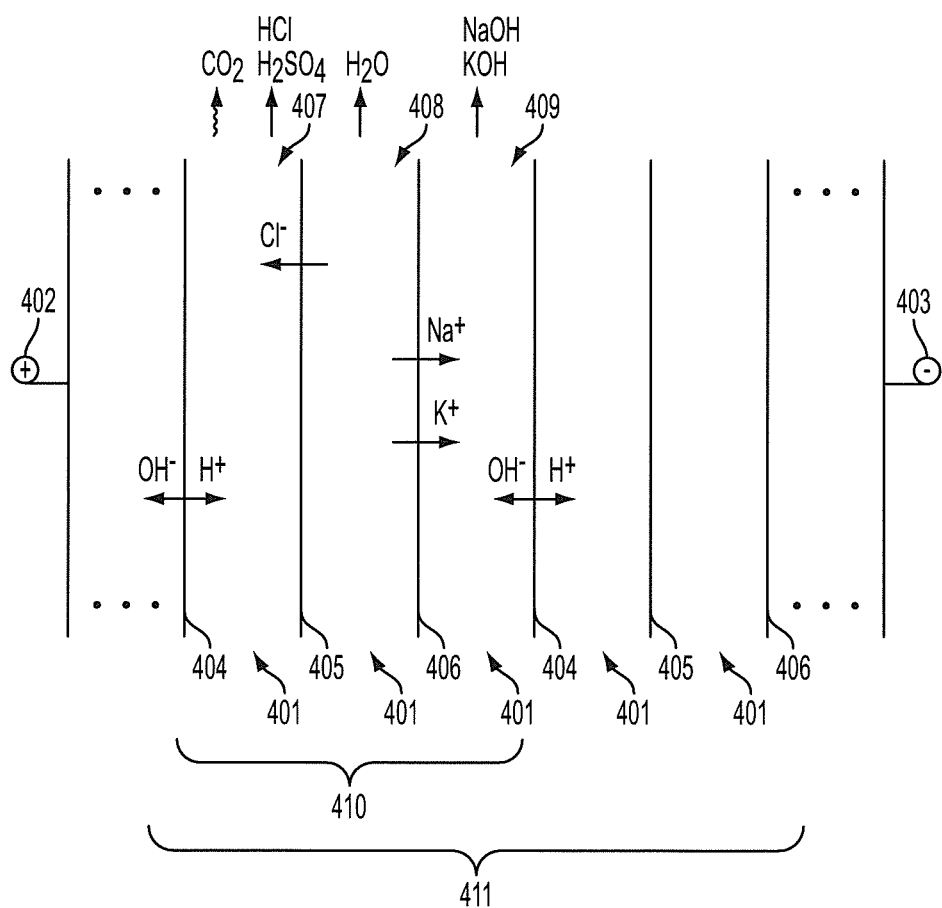
FIG. 4 is a schematic of a BPMED membrane stack operation used to generate $CO_2$ gas from a process solution using a "three-compartment" BPMED stack.

The BPMED system in FIG. 1 includes a BPMED apparatus 101, which has a membrane stack with either one or more two-compartment cells (see FIG. 3), or one or more three-compartment cells (see FIG. 4). In a system where the BPMED apparatus 101 includes a membrane stack with one or more two-compartment cells, a process solution, such as a seawater solution or an RO brine, is loaded into the solution tanks 104 and 105. Once the "batch" of process solution has been loaded into the tanks, the solution is then pumped from tanks 104 and 105 into the BPMED apparatus 101. A voltage is applied to the BPMED apparatus 101 by a power supply (not shown). Electrode solution 103 is also flowed through the BPMED apparatus 101 at either end of the apparatus; electrode solution 103 is flowed across the electrodes of the BPMED apparatus 101 only. As the process solution flows through the BPMED apparatus 101, BPMED occurs; the process solution becomes acidified in the acidified solution compartments of the membrane stack, and becomes basified in the basified solution compartments of the membrane stack (see FIG. 3). Two solution streams leave the apparatus 101—an acidified solution stream, which flows into tank 105, and a basified solution stream, which flows into tank 104.

In a system where the BPMED apparatus 101 includes a membrane stack with one or more three-compartment cells (see FIG. 4), the same general process occurs: a process solution is flowed into the apparatus 101, electrode solution 103 is flowed into the apparatus 101 at either end and across the electrodes, a voltage is applied using a power supply, and as the process solution flows through the apparatus 101, BPMED occurs. As with the two-compartment cell, the process solution becomes acidified in the acidified solution compartments of the membrane stack, and becomes basified in the basified solution compartments of the membrane stack (see FIG. 4). Additionally, in the case of a three-compartment cell, the process solution becomes desalinated in the third compartments of the membrane stack (see FIG. 4). Three solution streams then leave the apparatus 101—an acidified solution stream, which flows into tank 105; a basified solution stream, which flows into tank 104; and desalinated solution, which flows into a third tank (not shown). The desalinated solution may be used, for example, as drinking water.

In an embodiment, the acidified solution stream does not flow directly from the apparatus 101 to the acidified solution tank 105, but rather first flows through a $CO_2$ desorption unit 108, which is connected to a vacuum pump 109 so that $CO_2$ gas can be actively extracted from the acidified solution as it passes through the $CO_2$ desorption unit 108. Once the $CO_2$ is extracted from the acidified solution, the acidified solution exits the $CO_2$ desorption unit 108 and flows to the acidified solution tank 105. The vacuum pump 109 may be connected to a $CO_2$ collection unit 111, such as a tank, that collects the extracted $CO_2$. The system may also include a $CO_2$ flow meter 110 between the $CO_2$ desorption unit 108 and the vacuum pump 109 in order to monitor the flow of the $CO_2$ gas extracted from the acidified solution. The $CO_2$ desorption unit 108 and vacuum pump 109 may be used with either a two-compartment or a three-compartment BPMED unit 101.

In an embodiment, the $CO_2$ desorption unit 108 consists of one or more membrane contactors in series (see, for example, Liqui-Cel, Carbon Dioxide Removal from Water, http://www.liquicel.com/applications/CO2.cfm, last visited Jun. 20, 2011). In another embodiment, the $CO_2$ desorption unit 108 is a tank with a means of agitating the solution, for example, a showerhead fixture. It will be appreciated that other means for agitating the acidified solution and/or mixing the gas headspace in the acidified solution tank 105 may also be used.

In another embodiment, the system does not include a $CO_2$ desorption unit 108 such that the acidified solution stream flows directly from the BPMED apparatus 101 to the acidified solution tank 105. The $CO_2$ gas may passively evolve from the acidified solution in the acidified solution tank 105, and may be collected in a $CO_2$ collection unit 115 attached to the acidified solution tank 105. Alternatively, the system may include a means for agitating the acidified solution in the acidified solution tank such that $CO_2$ gas is actively evolved from the acidified solution, for example, a showerhead fixture or a vacuum pump. The actively evolved $CO_2$ gas may be collected by a $CO_2$ collection unit 115 attached to the acidified solution tank 105.

Once the acidified and basified solutions flow from the BPMED apparatus 101 and into the acidified and basified solution tanks 104 and 105, the acidified and basified solutions may be flowed back into the BPMED apparatus. In this manner, the process solution is flowed through the apparatus more than one time.

In an embodiment, the system includes a recombination unit 114. The recombination unit 114 may be, for example, a separate tank which receives the acidified and basified solutions from their respective tanks 105 and 104 after the solutions have made the desired number of passes through the BPMED apparatus. When the acidified and basified solutions are recombined, they once again become neutralized, and in the case of seawater can be pumped directly back into the sea. Because no additional chemicals need to be added to the solution, pumping the neutralized solution back into the sea will have little to no harmful effects. It also enables the system to be used as a method of "scrubbing" $CO_2$ from the earth's oceans.

In an embodiment, the BPMED unit 101 can be descaled by periodically flowing an acidic solution through the unit. The acidic solution used may be the output acidic solution that results from the BPMED process. In this manner, any scaling that results from any divalent cations in the basified solution—for example $Mg^{2+}$ and $Ca^{2+}$—that are present in the process solution will be periodically cleaned via contact with the acidic solution.

"Once-Through" Mode

FIG. 2 is a schematic of a BPMED system, operated in "once-through" mode, that is used to extract $CO_2$ from a process solution according to embodiment processes. In once-through mode, a process solution is flowed through the apparatus only one time. In the case of seawater, the seawater may be pumped directly from the ocean into the apparatus, undergo one of the described processes, and then be returned directly to the sea.

The BPMED system in FIG. 2, like the BPMED system in FIG. 1, includes a BPMED apparatus 201, which has a membrane stack with either one or more two-compartment cells (see FIG. 3), or one or more three-compartment cells (see FIG. 4).

A BPMED system operated in "once-through" mode operates similarly to a BPMED system operated in "batch" mode (FIG. 1): a process solution is flowed into the apparatus 201, a voltage is applied, electrode solution 203 is flowed into the BPMED apparatus 201 at either end, and, as the solution flows through the apparatus 201, BPMED occurs. In the case of a BPMED apparatus 101 with a membrane stack composed of one or more two-compartment cells, an acidified stream and a basified stream leave the apparatus 201. In the case of a BPMED apparatus 201 with a membrane stack composed of one or three-compartment cells, an acidified stream, a basified stream, and desalinated solution leave the apparatus 201.

Also similarly to a BPMED system operated in batch mode (FIG. 1), the acidified solution stream can either flow directly from the apparatus 201 to the acidified solution tank 205, or it can first flow through a $CO_2$ desorption unit 208. The $CO_2$ desorption unit 208 may be connected to a vacuum pump 209 so that $CO_2$ gas can be actively extracted; the vacuum pump 209 can be connected to a $CO_2$ collection unit 211, such as a tank, that collects the extracted $CO_2$. The system may also include a $CO_2$ flow meter 210 between the $CO_2$ desorption unit 208 and the vacuum pump 209 in order to monitor the flow of the $CO_2$ gas extracted from the acidified solution. Alternatively, the $CO_2$ desorption unit 208 may consist of one or more membrane contactors in series, or may be a tank with a means of agitating the solution, for example, a showerhead fixture. In another embodiment, the system does not include a $CO_2$ desorption unit 208; the acidified solution flows directly from the apparatus 201 into the acidified solution tank 205, where the $CO_2$ may either passively evolve in the tank 205 or be actively evolved in the tank 205. The gas, whether passively or actively evolved, may be collected by a $CO_2$ collection unit 215 attached to the acidified solution tank 205.

The difference between a BPMED apparatus operated in "once through" mode (FIG. 2) and a BPMED apparatus operated in "batch" mode (FIG. 1) is that for a system operated in "once through" mode, once the acidified and basified solutions flow from the apparatus 201 into their respective tanks 204 and 205, the acidified and basified solutions are not flowed back into the BPMED apparatus. Thus, the process solution is only flowed through the apparatus 201 one time.

In an embodiment, the system includes a recombination unit 214, for example, a separate tank which receives the acidified and basified solutions from their respective tanks 205 and 204 after the solutions pass once through the BPMED apparatus. When the acidified and basified solutions are recombined, they once again become neutralized, and in the case of seawater can be pumped directly back into the sea. Because no additional chemicals need to be added to the solution, pumping the neutralized solution back into the sea will have little to no harmful effects. It also enables the system to be used as a method of "scrubbing" $CO_2$ from the earth's oceans.

As with the BPMED system operated in "batch" mode (FIG. 1), the BPMED unit 201 can be descaled by periodically flowing an acidic solution through the unit. The acidic solution used may be the output acidic solution that results from the BPMED process. In this manner, any scaling that results from any divalent cations in the basified solution—for example $Mg^{2+}$ and $Ca^{2+}$—that are present in the process solution will be periodically cleaned via contact with the acidic solution.

BPMED Membrane Stack Operation

FIG. 3 shows a schematic of BPMED membrane stack operation used to generate $CO_2$ gas from a single process solution, such as a seawater solution or RO brine using a "two-compartment" BPMED stack. A voltage is applied across an alternating stack of BPMs 304 and AEMs 305. An acidified solution compartment 306 is formed between the BPMs 304 and their adjacent AEMs 305, and a basified solution compartment 307 is formed between the AEMs 305 and their adjacent BPMs 304. The number of acidified solution compartments 306 and basified solution compartments 307 in a given electrodialysis stack 308 is a function of the number of electrodialysis cells 309 in the stack 308. An electrodialysis apparatus can be adapted to receive any number of electrodialysis cells 309. The electrodialysis stack 308 also includes two end membranes, one at either end of the BPMED stack 308 (not shown). Each of these end membranes may be a BPM, AEM, or CEM, depending on the membrane stack configuration and the process solutions and conditions used.

A single process solution 301 is flowed through all compartments 306 and 307 of the electrodialysis stack 308. In an embodiment, the process solution 301 is a seawater solution. For example, the electrodialysis apparatus may be used on a ship at sea, and seawater may be taken directly from the ocean and flowed into the electrodialysis apparatus. Alternatively, the seawater solution may be a manmade seawater solution, such as that made with Instant Ocean® Sea Salt. Alternatively, the process solution 301 may be a concentrated process solution, such as RO brine. The only other solution flowed into the electrodialysis apparatus is an electrode solution, such as KOH or $H_2SO_4/Na_2SO_4$, which is flowed into the two electrode compartments (not shown) located each end of the electrodialysis stack 308 such that it flows across the electrodes 302 and 303 located at each end of the stack 308.

Under the voltage applied at electrodes 302 and 303, the AEMs 305 permit negatively charged anions to pass across the membrane from the negative electrode 303 to the positive electrode 302. In the case of a seawater solution, almost all of the ionic transport across the AEMs 305 is in the form of $Cl^-$ ions, since $Cl^-$ ions are in high proportion in seawater (approximately 546 mM). The BPMs 304 effectively dissociate water into $H^+$ and $OH^-$ ions under the applied voltage, with the $H^+$ ions transported from the middle of the BPMs 304 toward the negative electrode 303 and the $OH^-$ ions transported from the middle of the BPMs 304 toward the positive electrode 302. Through this process, the process solution 301 becomes acidified in the acidified solution compartments 306 because of the transport of the $H^+$ ions into the acidified solution compartments 306. The process solution 301 also becomes basified in the basified solution compartments 307 because of the transport of the $OH^-$ ions into the basified solution compartments 307.

For each $Cl^-$ ion that is transported from the basified compartments 307 to the acidified compartments 306, a $H^+$ ion is transported from the middle of the adjacent BPM 304 into the acidified compartments 306, and a $OH^-$ ion is transported from the middle of the adjacent BPM 304 into the basified compartments 307. In this way, operation of the electrodialysis apparatus decreases the pH of the acidified solution compartments 306 and increases the pH of the basified solution compartments 307. The change in pH from input to output depends on the composition of the process solution 301; the rate of ion transport, which is governed by the applied current and system efficiencies; and the flow rate of the solution 301 through the apparatus.

$CO_2$ is extracted from the process solution 301 flowing through the acidified compartments 306 via conversion of bicarbonate ($HCO_3^-$) ions into dissolved $CO_2$ as the pH of the acidified compartments 306 decreases. The process solution 301 flowing through the acidified compartments 306 is essentially being titrated by HCl. When the pH of the single solution 301 is decreased down to about pH 4, approximately 99% of the $HCO_3^-$ ions are converted to $CO_2$ (see, for example, James N. Butler, *Carbon Dioxide Equilibria and Their Applications*, Addison-Wesley Publishing Company, Menlo Park, Calif., 1982, p. 123, FIG. 5.1).

FIG. 4 shows a schematic of a BPMED membrane stack configuration 411 used to generate $CO_2$ gas from a process solution, such as a seawater solution or RO brine, using a "three-compartment" BPMED stack. A voltage is applied across an alternating stack of BPMs 404, AEMs 405, and CEMs 406. In the embodiment shown in FIG. 4, the alternating BPMs 404, AEMs 405, and CEMs 406 form a "three-compartment" BPMED stack. An acidified solution compartment 407 is formed between the BPMs 404 and their adjacent AEMs 405; a basified solution compartment 409 is formed between the CEMs 406 and their adjacent BPMs 404; and desalinated solution is produced in the center compartment 408 between the AEM 405 and its adjacent CEM 406. Thus, in the embodiment shown in FIG. 4, the BPMED membrane stack 411 not only generates $CO_2$ gas from the a seawater solution 401, it also generates desalinated water which can be used as drinking water. RO brine, as well as other aqueous salt solutions, will also generate a desalted solution in the center compartment 408, but the degree to which the process solution 401 is desalted depends on the flow rate of the process solution 401, the applied current density, and the efficiency of ion transport.

The number of acidified solution compartments 407, basified solution compartments 409, and center compartments 408 in a given BPMED stack 411 is a function of the number of cells 410 in the stack 411. A BPMED apparatus can be adapted to receive any number of cells 410. The BPMED stack 411 also includes two end membranes, one at either end of the BPMED stack 411 (not shown). Each end membrane may be a BPM, AEM, or CEM, depending on the membrane stack configuration and process solutions and conditions.

When a voltage is applied at electrodes 402 and 403, the AEMs 405 permit negatively charged anions—mostly $Cl^-$ ions in the case of a process solution 401 that is seawater—to pass across the membrane from the negative electrode 403 to the positive electrode 402. The BPMs 404 effectively dissociate water into $H^+$ and $OH^-$ ions under the applied voltage, with the $H^+$ ions transported from the middle of the BPMs 404 toward the negative electrode 403 and the $OH^-$ ions transported from the middle of the BPMs 404 toward the positive electrode 402. The CEMs 406 permit positively charged anions, such as $Na^+$ and $K^+$, to pass across the membrane from the positive electrode 402 to the negative electrode 403. Through this process, the process solution 401 becomes acidified in the acidified solution compartments 407 and basified in the basified solution compartments 409; and desalted solution is generated in the center compartments 408.

As with the two-compartment configuration shown in FIG. 3, $CO_2$ is extracted from the single process solution 401 flowing through the acidified compartments 407 via conversion of $HCO_3^-$ ions into dissolved $CO_2$ as the pH of the acidified compartments 407 decreases. The process solution 401 flowing through the acidified compartments 407 is essentially being titrated by HCl. When the pH of the process solution 401 is decreased down to about pH 4, approximately 99% of the $HCO_3^-$ ions are converted to $CO_2$ (see, for example, James N. Butler, *Carbon Dioxide Equilibria and Their Applications*, Addison-Wesley Publishing Company, Menlo Park, Calif., 1982, p. 123, FIG. 5.1).

The acidified and basified solutions generated by the processes shown in FIGS. 3 and 4 can be recombined after the $CO_2$ gas is extracted from the acidified solution. When the acidified and basified solution streams are recombined, they become neutralized. In the case of a solution 301/401 that is a seawater solution, this recombined solution can be put straight back into the ocean. Because no additional chemicals are needed for the process, the post-process recombined solution is not ecologically harmful in the way that a post-process solution containing added chemicals could be.

For the embodiments shown in FIGS. 3 and 4, $CO_2$ gas is regenerated from the acidified solution. The process solution acidifies in the acidified solution compartments 306/407 because of the transport of $H^+$ ions across the BPMs 304/404 and into the acidified solution compartments 306/407. Reducing the pH of 50 mL of seawater from pH 8 to pH 4 requires 5 mL of 0.025M HCl, corresponding to the addition of 2.5 mmol of HCl per liter of seawater. $HCO_3^-$ ions are found in seawater at concentrations of 2.2 to 2.5 mM, so converting all the $HCO_3^-$ in seawater via acidification will generate approximately 2.2 to 2.5 mmol of $CO_2$ per liter of seawater, equivalent to 49.2 to 56 mL of $CO_2$ per liter of seawater. The initial concentration of $HCO_3^-$ in seawater (2.2 to 2.5 mM) combined with Henry's Law constant for $CO_2$ in seawater of $10^{-1.536}$ mole/(L atm) means that the dissolved $CO_2$ converted from $HCO_3^-$ is in equilibrium with a pure $CO_2$ atmosphere at a pressure of 0.076 to 0.086 atm. Therefore, in order to extract a stream of pure $CO_2$, the acidified solution can be pumped on with a vacuum pump to extract the dissolved $CO_2$ gas from the acidified solution. In another embodiment, the acidified solution is agitated and the gas headspace in the acidified solution tank is mixed in order to extract the dissolved $CO_2$ gas. In another embodiment, the acidified solution is passed at least once over at least one membrane contactor that uses a vacuum pump or sweep gas in order to extract the dissolved $CO_2$. Alternatively, the $CO_2$ gas can simply be allowed to passively evolve out of solution at whatever levels it may come out of solution, without pumping, agitating, mixing, or flowing the solution over a membrane contactor.

These and other features of embodiments will be better understood by turning to the following experimental results.

Batch-Mode Experimental Results for an Embodiment Process of Separating $CO_2$ Gas from Process Solutions Using Electrodialysis The membrane stack configuration shown in FIG. 3, operating in batch mode (FIG. 1), was used to perform a suite of experiments to characterize the performance of BPMED for removal of $CO_2$ from the following process solutions: "idealized" seawater, prepared using DI water, 0.5M NaCl, and 2.5 mM NaHCO$_3$ but no divalent cations such as $Mg^{2+}$ and $Ca^{2+}$; "'real" seawater, prepared using Instant Ocean® Sea Salt which includes divalent cations like $Mg^{2+}$ and $Ca^{2+}$; and "real" RO brine, prepared using 2× Instant Ocean® Sea Salt. Excluding divalent cations and other ions from "idealized" seawater allowed the performance to be determined without the additional effects of scaling and reduced transport efficiency due to the presence of other ions, such as $Mg^{2+}$ and $Ca^{2+}$. For these experiments, two separate units—a BPMED unit and a membrane contactor unit—were used, the two units separated by time, as represented by the schematic in FIG. 5.

For each experiment, an eight-cell two-compartment electrodialysis stack was used of the BPM, AEM, BPM, AEM type with CEM end membranes. The cross-sectional area of each membrane was approximately 180 cm². It will be understood that an electrodialysis stack composed of any number n of cells can be used; the eight-cell stack used in these experiments is not the only possible configuration. Further, it will be understood that three-compartment stacks of any number n of cells could alternatively be used, such as the configuration shown in FIG. 4. It will also be understood that membranes of different cross-sectional areas may be used.

In the experiments, the AEM/CEM/BPM used were Neosepta AMX/C66-10F/BP-1E from Ameridia Corporation. The electrode solution was 2M NaOH with nickel electrodes. It will be understood that other AEM/CEM/BPM types from other manufacturers can be used. It will also be understood that other electrode solutions of other concentrations with electrodes made of different metals could be used. For example, electrodes made of iridium-ruthenium coated Ti with an $H_2SO_4$/$Na_2SO_4$ electrode solution could be used, as described below.

Table 1 summarizes the different experiments conducted.

TABLE 1

Summary of Experiments Performed

| Ex. No. | Seawater Solution | Flow rate (lpm) | Current (A) | Current Density (mA/cm$^2$) | Remarks |
|---|---|---|---|---|---|
| 1 | Idealized | 3.75 | 4.5 | 25 | |
| 2 | Real | 3.75 | 4 | 22 | |
| 3 | Real | 3.75 | 4.5 | 25 | |
| 4 | Real | 3 | 3.5 | 19 | |
| 5 | Real | 3 | 4 | 22 | |
| 6 | Real | 4.25 | 4.5 | 25 | |
| 7 | Real | 4.25 | 5 | 28 | |
| 8 | Real | 5 | 5.5 | 31 | |
| 9 | Real | 5 | 6 | 33 | |
| 10 | Real | 5 | 6 | 33 | w/30 s pause |

As Table 1 shows, a comparison was made between "idealized" and "real" seawater at the flow rate of 3.75 lpm and 4.5 A applied current, a current density of 25 mA/cm$^2$ (Experiments 1 and 3). An additional experiment was conducted at 5 lpm and 6 A current (current density of 22 mA/cm$^2$) with a 30 second pause between flowing the solution through the electrodialysis unit 501 and flowing the solution through the membrane contactors 502/503 (Experiment 10) in order to evaluate the effect of any mixing of the solution coming out from the electrodialysis unit 501 before extracting $CO_2$ in the membrane contactors 502/503. The objective was also to see the effect of mixing in pH change, if any.

Figure 5:
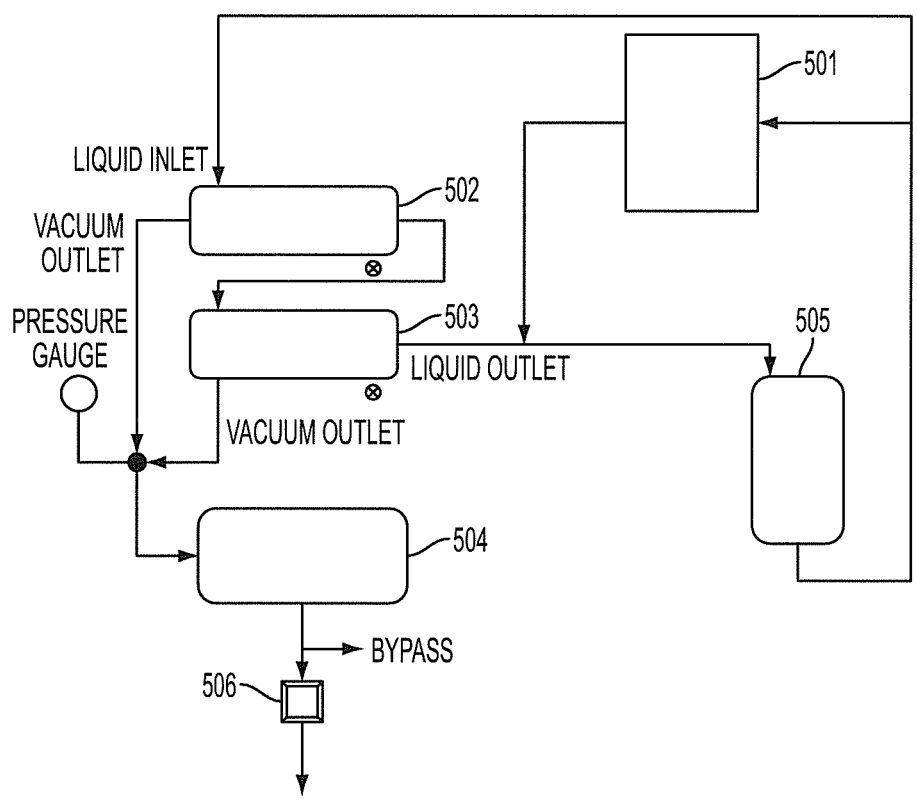
FIGS. 5 and 6 are schematics of a BPMED system used for experiments testing embodiment processes of separating $CO_2$ gas from process solutions using electrodialysis.

FIG. 5 shows a flow diagram of the combined electrodialysis unit 501 and membrane contactors 502/503 but does not show the electrolyte and base tanks for simplicity. The acid tank 505 and the base tank were each filled with 5 L of either "idealized" or "real" seawater solution, depending on the experiment (see Table 1). The electrolyte tank was filled with 5 L of 2M NaOH solution. The seawater solution was then run through the BPMED unit 501, but not through the membrane contactors 502/503; the vacuum pump 504 was started to record the offset value. The pH of the seawater solution was driven down to approximately pH 4 by running the seawater solution through the BPMED unit 501 for "once-through" time, defined as the time needed to flow the 5 L of seawater solution through the electrodialysis unit 501 exactly once given the volumetric flow rate; this was done by applying the current needed to reach pH 4 in "once-through" time.

The power supply to the electrodialysis unit 501 was disconnected and the solution flow switched to bypass mode immediately after the once-through time without turning off the vacuum pump 504, thereby diverting the seawater solution to the membrane contactors 502 and 503. The electrolyte and base flows were also diverted to bypass mode after the once-through time was reached. For Experiment 10 (Table 1), the solution's flow was switched to the membrane contactors 502 and 503 after a pause of 30 seconds after the power supply was stopped; the system was run in bypass mode to let the solution mix properly in the acid tank 505.

The membrane contactors 502 and 503 were already being pumped by vacuum pump 504 with output through $CO_2$ flow meter 506, so all the $CO_2$ extracted by the membrane contactors 502 and 503 was recorded once the flow was switched to the membrane contactors 502 and 503. The results of the experiments run on the system shown in FIG. 5 are summarized in Table 2. The entries for Experiment 1 (idealized seawater solution) and Experiment 3 (real seawater solution) show that the difference between idealized and real seawater solutions was not significant.

TABLE 2

Summary of Experiments with Varying Flow Rate, Current, Seawater Solution, and Procedure.

| Ex. No. | Flow Rate (lpm) | Current (A) | Current Density (mA/cm$^2$) | $CO_2$ (mol) | Energy (kJ/mol) | Efficiency (%) | End pH | $CO_2$ (lpm) |
|---|---|---|---|---|---|---|---|---|
| 1 | 3.75 | 4.5 | 25 | 0.0080 | 567 | 70 | 3.13 | 0.146 |
| 2 | 3.75 | 4 | 22 | 0.0087 | 500 | 76 | 3.90 | 0.157 |
| 3 | 3.75 | 4.5 | 25 | 0.0082 | 616 | 72 | 3.41 | 0.149 |
| 4 | 3 | 3.5 | 19 | 0.0074 | 621 | 65 | 3.55 | 0.108 |
| 5 | 3 | 4 | 22 | 0.0088 | 709 | 77 | 3.20 | 0.127 |
| 6 | 4.25 | 4.5 | 25 | 0.0054 | 882 | 47 | 5.37 | 0.111 |
| 7 | 4.25 | 5 | 28 | 0.0059 | 941 | 52 | 3.55 | 0.121 |
| 8 | 5 | 5.5 | 31 | 0.0055 | 877 | 48 | 6.58 | 0.133 |
| 9 | 5 | 6 | 33 | 0.0075 | 704 | 65 | 5.90 | 0.181 |
| 10 | 5 | 6 | 33 | 0.0078 | 676 | 68 | 3.84 | 0.189 |

Different combinations of applied current and flow rates were also investigated (Experiments 2, 4-9). A flow rate of approximately 4 lpm resulted in the highest membrane contactor extraction efficiency. Accordingly, a range of flow rates around 4 lpm—3, 3.75, 4.25, and 5 lpm—was tested, along with corresponding values of applied currents to achieve a pH of around 4 in the acidified solution at the end of the BPMED process. The combination of 3.75 lpm of flow rate and 4 A current (current density of 22 mA/cm$^2$) (Experiment 2) had the lowest energy consumption—500 kJ/mol—for the electrodialysis process, with an efficiency (percent of $CO_2$ present in the input solution in the form of $HCO_3^-$ that is extracted as $CO_2$ gas) of 76%. The conditions used for Experiment 2 also produced an average rate of $CO_2$ extraction for 5 L of solution in once-through conditions of 0.157 lpm. Experiment 5, which used a flow rate of 3 lpm and a current of 4 A (current density of 22 mA/cm$^2$), produced slightly higher efficiency in terms of $CO_2$ extraction (77%), but the total energy consumption was increased (709 kJ/mol) as the once-through time increased due to the lower flow rate. It will be appreciated that the flow rate and current selected for the BPMED of seawater to extract $CO_2$ need not be 3.75 lpm and 4 A; as the results in Table 2 show, many other combinations of flow rates and currents (including combinations not shown in Table 2) are capable of extracting $CO_2$ from seawater.

Table 3 summarizes the results of similar experiments conducted using an approximate RO brine solution rather than "idealized" or "real" seawater solution. The approximate RO brine solution was prepared by doubling the concentration of Instant Ocean® salt, as many RO brines have ion concentrations that are approximately double to that seen in seawater.

TABLE 3

Summary of Experiments with Varying Flow Rates for RO Brine Solution.

| Ex. No. | Flow Rate (lpm) | Current (A) | Current Density (mA/cm²) | CO₂ (mol) | Energy (kJ/mol) | Efficiency (%) | End pH | CO₂ (lpm) |
|---|---|---|---|---|---|---|---|---|
| 1 | 3 | 7 | 39 | 0.014 | 815 | 62 | 3.91 | 0.208 |
| 2 | 3.75 | 8 | 44 | 0.012 | 1006 | 52 | 5.66 | 0.217 |
| 3 | 4.25 | 10 | 56 | 0.013 | 1107 | 57 | 4.86 | 0.273 |
| 4 | 5 | 11 | 61 | 0.012 | 1254 | 53 | 4.96 | 0.296 |
| 5 | 2.5 | 5.5 | 31 | 0.013 | 753 | 56 | 4.61 | 0.156 |

As Table 3 shows, in the case of RO brine solution, the system was more efficient while operating at lower flow rates. An efficiency of 62% was found at a flow rate of 3 lpm and a current of 7 A (current density of 39 mA/cm²). The energy requirement was lowest at a flow rate of 2.5 lpm and a current of 5.5 A (current density of 31 mA/cm²). Approximately double amplitude of current was needed for titration similar to that seen for seawater solutions (Table 2), and the voltage was increased for RO brine resulting in a higher energy requirement per mole of $CO_2$ extracted than for seawater solution.

Once-Through Experimental Results for an Embodiment Process of Separating $CO_2$ Gas from Process Solutions Using Electrodialysis To characterize the performance of a system operating in once-through mode, experiments were performed using the following process solutions: "idealized" seawater, prepared using DI water, 0.5M NaCl, and 2.5 mM $NaHCO_3$ but no divalent cations such as $Mg^{2+}$ and $Ca^{2+}$; "real" seawater, prepared using Instant Ocean® Sea Salt which includes divalent cations like $Mg^{2+}$ and $Ca^{2+}$; and "real" RO brine, prepared using 2× Instant Ocean® Sea Salt.

For each experiment, an eight-cell two-compartment electrodialysis stack was used of the BPM, AEM, BPM, AEM type with CEM end membranes. The cross-sectional area of each membrane was approximately 180 cm². It will be understood that an electrodialysis stack composed of any number n of cells can be used; the eight-cell stack used in these experiments is not the only possible configuration. Further, it will be understood that three-compartment stacks of any number n of cells could alternatively be used, such as the configuration shown in FIG. 4. It will also be understood that membranes of different cross-sectional areas may be used.

Figure 6:
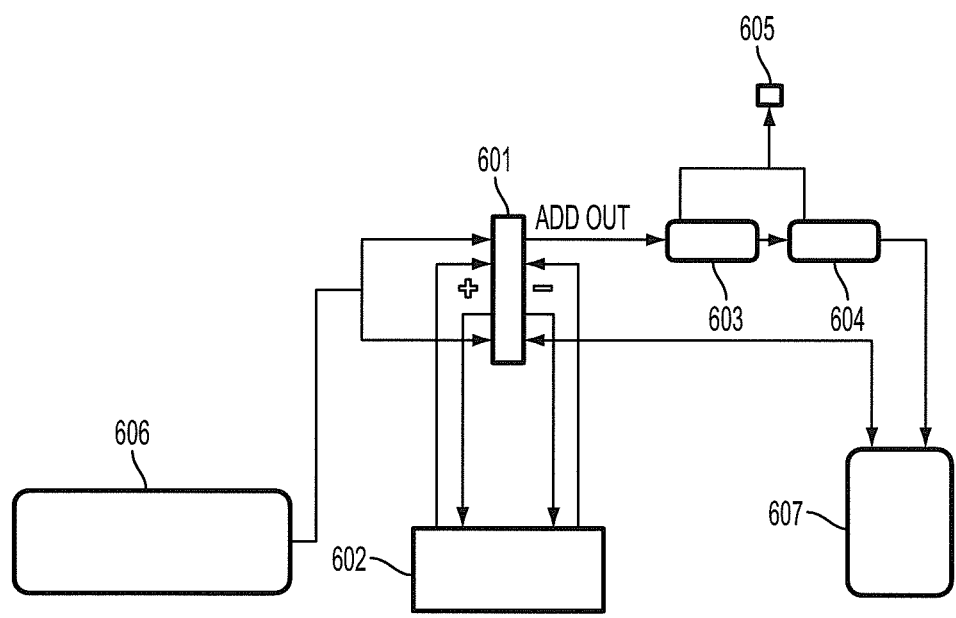

FIG. 6 shows a schematic of the experimental setup used. The system included a BPMED apparatus 601. The apparatus 601 used titanium electrodes, so an acidic electrode solution 602 (0.1M $H_2SO_4$/0.25M $Na_2SO_4$) was used. The system used also included two membrane contactors 603 and 604 in series, as well as a $CO_2$ flow meter 605 to monitor the flow of the $CO_2$ gas extracted from the acidified solution, although it will be appreciated that other methods of actively or passively drawing the $CO_2$ out of solution can be used. The system further included an input tank 606 from which the process solution was pumped, and a collection tank 607 to receive the acidified and basified solution output from the BPMED apparatus 601.

First, idealized seawater was tested. For all experiments, a flow rate of 3.1 lpm was used for the acid solution, and a flow rate of 4.0 lpm was used for the base solution. A higher base solution volumetric flow rate was used in order to equalize the pressures in both solutions, as the membrane contactors cause an extra pressure drop in the acid flow path relative to the base solution flow path. Electrode solution 602 was flowed into the BPMED apparatus 601 at the electrodes, and idealized seawater solution was flowed into the apparatus 601 from the input tank 606. A vacuum pump (not shown) connected to the membrane contactors 603 and 604 was started in bypass mode and then switched to flow through the flow meter 605. Power was supplied to the membrane stack of the apparatus 601 manually in constant-current mode.

Steady-state measurements were taken once the pH values were steady, and were made at different constant-current values, keeping all other parameters constant. The results of the experiments are shown in Table 4.

TABLE 4

Summary of Experiments for Idealized Seawater at Different Applied Currents.

| Applied Current (A) | Current Density (mA/cm²) | Voltage (V) | Actual CO₂ Flow Rate (lpm) | Energy (kJ/mol) | Acid pH | Base pH |
|---|---|---|---|---|---|---|
| 1 | 6 | 10.2 | 0.04 | 421 | 6.1 | 10.2 |
| 1.5 | 8 | 11.2 | 0.13 | 213 | 5.8 | 10.5 |
| 2 | 11 | 12.1 | 0.14 | 285 | 3.5 | 11.1 |
| 3 | 17 | 13.8 | 0.15 | 456 | 3.0 | 11.5 |
| 3.5 | 19 | 14.5 | 0.15 | 559 | 2.5 | 11.9 |
| 4 | 22 | 15.4 | 0.14 | 727 | 2.5 | 12.0 |

Through the use of a "once-through" unit, steady-state conditions can be achieved. This facilitates varying the current for a fixed flow rate to adjust the acid pH. In this way the current can be optimized to extract most of the $CO_2$ with the least amount of energy. For example, the results in Table 4 show that at an applied current of 1.5 A (current density of 8 mA/cm²), 0.13 lpm of $CO_2$ was extracted with an input of 213 kJ/mol $CO_2$; at 2 A (current density of 11 mA/cm²), 0.14 lpm of $CO_2$ was extracted with an input of 285 kJ/mol $CO_2$.

Next, "real" seawater and RO brine were tested. Three different flow rates were tested. For each flow rate, three different solutions (idealized seawater, real seawater, and RO brine) were titrated to approximate pH values of 4, 5, and 6 by applying the appropriate current for the chosen solution and its flow rate.

Figure 7:
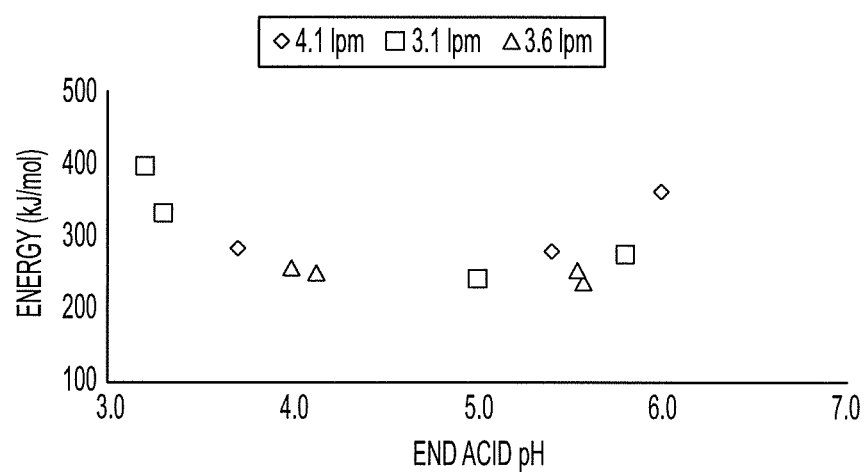
FIG. 7 is a plot of energy consumption at various acid-solution end-pH values and flow rates for real seawater.

The results of the experiments testing "real" seawater are shown in Table 5. FIG. 7 is a graph of the experimental results for "real" seawater showing energy consumption at various acid-solution end-pH values and flow rates.

TABLE 5

Summary of Experiments for "Real" Seawater at Different Flow Rates.

| Solution Flow Rate (lpm) | Acid pH | CO₂ Flow Rate (lpm) | Energy (kJ/mol) | Efficiency (%) |
|---|---|---|---|---|
| 4.1 | 6.0 | 0.10 | 361 | 31 |
| 4.1 | 3.7 | 0.22 | 284 | 67 |
| 4.1 | 5.4 | 0.17 | 280 | 52 |
| 3.1 | 3.2 | 0.16 | 396 | 65 |
| 3.1 | 5.0 | 0.15 | 241 | 61 |
| 3.1 | 5.8 | 0.09 | 274 | 37 |
| 3.1 | 3.3 | 0.17 | 331 | 69 |
| 3.6 | 4.0 | 0.19 | 256 | 66 |
| 3.6 | 5.5 | 0.14 | 255 | 49 |
| 3.6 | 4.1 | 0.17 | 250 | 59 |
| 3.6 | 5.6 | 0.13 | 236 | 45 |

Figure 8:
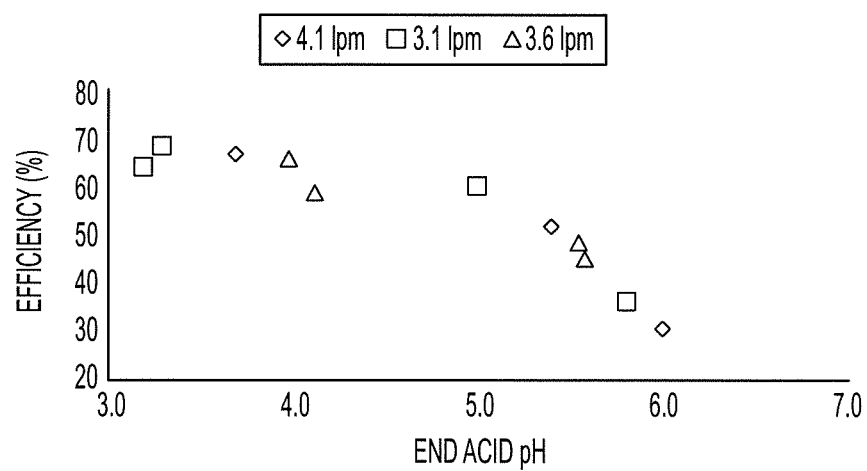
FIG. 8 is a plot of efficiency of $CO_2$ separation at various acid-solution end-pH values and flow rates for real seawater.

Table 5 and FIG. 7 show the experimental results for experiments with real seawater. FIG. 7 shows that: 1) Within the flow-rate range of 3.1 lpm-4.1 lpm, solution flow rate does not significantly affect the results; and 2) The optimum end pH for minimizing the energy consumed per mol ($CO_2$) separated is around a pH of 4.5. The optimum in FIG. 7 results from the trade-off between the smaller amount of $CO_2$ extracted at high pH values (around pH=6) and the diminishing returns in terms of $CO_2$ extraction for expending the additional energy required to acidify the input seawater to pH 3 at low pH values. This is also illustrated by the efficiency (extracted $CO_2$ divided by the total $CO_2$ contained in the input solution) plotted in FIG. 8.

Figure 9:
FIG. 9 is a plot of efficiency of $CO_2$ separation at various acid-solution end-pH values for various process solutions at a flow rate of 3.1 lpm.

FIG. 9 shows the efficiency of $CO_2$ separation for different solutions (idealized seawater, real seawater, and RO brine) for a flow rate of 3.1 lpm. FIG. 9 shows that the efficiency of separation depends on the end pH of the acidic solution, but for a given end pH, the efficiency is approximately the same for idealized seawater, real seawater, and RO brine.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
    flowing a process solution into a BPMED system with a BPMED apparatus having at least two compartments separated by membranes, wherein the process solution is one of a seawater solution, a brine or water that has absorbed gaseous $CO_2$;
    flowing an electrode rinse solution into the BPMED apparatus only across electrodes in the BPMED apparatus;
    applying a voltage to the BPMED apparatus and the process solution is acidified and basified, and dissolved $CO_2$ is generated in the acidified process solution;
    flowing the acidified and basified process solution out of the BPMED apparatus;
    desorbing the $CO_2$ out of the acidified process solution;
    combining the acidified and basified process solution such that the process solution is approximately neutral pH; and
    discharging the process solution from the BPMED system.

2. The method of claim 1 wherein the acidified process solution is flowed out of the BPMED apparatus and through a $CO_2$ desorption unit before being flowed to an acidified solution tank such that the desorbing occurs at the $CO_2$ desorption unit.

3. The method of claim 1 wherein the acidified process solution is flowed out of the BPMED apparatus and into an acidified solution tank such that the desorbing occurs at the acidified solution tank.

4. The method of claim 1 further comprising flowing the acidified process solution back through the BPMED apparatus to descale the BPMED apparatus.

5. The method of claim 1 wherein the BPMED apparatus comprises one or more three-compartment BPMED cells such that when the voltage is applied, the process solution is also desalted.

6. The method of claim 1 wherein a flow rate for flowing the process solution into the BPMED apparatus and a current applied by the voltage are selected such that an energy consumption of the BPMED apparatus is minimized.

7. The method of claim 6 wherein the flow rate is approximately 0.3 lpm per cell to 0.7 lpm per cell and the current density is approximately 19 $mA/cm^2$ to 61 $mA/cm^2$.

8. The method of claim 7 wherein the flow rate is approximately 0.5 lpm per cell and the current density is approximately 22 $mA/cm^2$.

9. The method of claim 7 wherein the flow rate is approximately 0.3 lpm per cell and the current is approximately 31 $mA/cm^2$.

10. The method of claim 1 wherein a current applied by the voltage is selected such that the process solution is acidified to a pH that minimizes an energy consumption of the BPMED apparatus.

11. The method of claim 10 wherein the pH is approximately 3 to 6.

12. The method of claim 11 wherein the pH is approximately 4.5.

13. A method for producing a desalted solution and $CO_2$ gas comprising:
    flowing a process solution comprised of one of seawater, a brine or water, wherein the process solution has absorbed gaseous $CO_2$ into a BPMED system with a BPMED apparatus, wherein the BPMED apparatus includes a membrane stack comprised of one or more three-compartment cells;
    flowing an electrode rinse solution into the BPMED apparatus only across electrodes in the BPMED apparatus, the process solution and the electrode rinse solution being the only solutions used;
    applying a voltage to the BPMED apparatus such that the process solution is acidified, basified, and desalted;
    flowing the acidified, basified, and desalted process solution out of the BPMED apparatus;
    desorbing the $CO_2$ out of the acidified process solution;
    combining the acidified and basified process solution such that the process solution is approximately neutral pH; and
    discharging the process solution from the BPMED system.

14. The method of claim 13 wherein the process solution is a seawater solution such that when the process solution is desalted, desalinated water is generated.

* * * * *